US008990470B1

(12) United States Patent
Sala et al.

(10) Patent No.: US 8,990,470 B1
(45) Date of Patent: Mar. 24, 2015

(54) VIRTUAL HUBS FOR COMMUNICATION INTERFACE

(75) Inventors: Leonardo Sala, Cornaredo (IT); Kenneth Jay Helfrich, Duluth, GA (US)

(73) Assignee: Maxim Integrated Products, Inc., San Jose, CA (US)

( * ) Notice: Subject to any disclaimer, the term of this patent is extended or adjusted under 35 U.S.C. 154(b) by 934 days.

(21) Appl. No.: 13/168,919

(22) Filed: Jun. 24, 2011

(51) Int. Cl.
G06F 13/14 (2006.01)
H04L 29/06 (2006.01)

(52) U.S. Cl.
CPC .................................. *H04L 29/06* (2013.01)
USPC ........................ 710/305; 710/306; 710/105

(58) Field of Classification Search
CPC ............ G06F 13/14; G06F 3/00; G06F 13/42
USPC ........... 710/9, 10, 63, 64, 105, 106, 305, 306, 710/312–315
See application file for complete search history.

(56) References Cited

U.S. PATENT DOCUMENTS

| 6,584,519 | B1 * | 6/2003 | Russell ............................ 710/62 |
| 6,708,247 | B1 * | 3/2004 | Barret et al. ................... 710/313 |
| 6,922,748 | B2 * | 7/2005 | Engler ............................ 710/313 |
| 7,120,724 | B2 * | 10/2006 | Ferguson ....................... 710/313 |
| 7,149,835 | B2 * | 12/2006 | Engler ........................... 710/300 |
| 7,334,072 | B1 * | 2/2008 | Wright ........................... 710/315 |
| 7,395,366 | B1 * | 7/2008 | Wright ........................... 710/315 |
| 2002/0010821 | A1 * | 1/2002 | Yu et al. ......................... 710/100 |
| 2004/0177197 | A1 * | 9/2004 | McLeod ........................ 710/300 |
| 2004/0205279 | A1 * | 10/2004 | Ohnishi ......................... 710/305 |
| 2005/0027889 | A1 * | 2/2005 | Sandulescu ................... 709/250 |
| 2006/0020736 | A1 * | 1/2006 | Jackson ......................... 710/313 |
| 2008/0028120 | A1 * | 1/2008 | McLeod ........................ 710/313 |
| 2008/0133804 | A1 * | 6/2008 | Iyer et al. ........................ 710/67 |
| 2008/0288708 | A1 * | 11/2008 | Hsueh ............................ 710/313 |

OTHER PUBLICATIONS

USB in a Nutshell. Making Sense of the USB Standard, www.beyondlogic.org, Nov. 2002.*
Analog Devices, Inc., "Full/Low Speed 5 kV USB Digital Isolator," Data Sheet, ADuM4160, Analog Devices, Inc., 2009-2012, pp. 1-16.

* cited by examiner

*Primary Examiner* — Khanh Dang
(74) *Attorney, Agent, or Firm* — TIPS Group (57) ABSTRACT

A communication interface hub includes multiple ports, where one of the ports is an upstream port operative to be in direct and/or indirect communication with a host and at least one other of the ports is a downstream port operative to be in direct and/or indirect communication with at least one device. At least one hub core is coupled to the ports and implements at least one physical hub, and at least one virtual hub core is coupled to the ports and implements at least one virtual hub. The virtual hub is detectable as at least one physical hub by the host to cause the host to allocate an additional time delay in waiting for responses to signals output by the host.

20 Claims, 7 Drawing Sheets

VIRTUAL HUBS FOR COMMUNICATION INTERFACE

BACKGROUND

Digital communication interfaces have become widespread with modern technology's emphasis on rapid transfer and communication of digital data for an ever-increasing amount of important functions, including data storage, output transmission, and device control. These interfaces include standard communication specifications such as Universal Serial Bus (USB), Serial Advanced Technology Attachment (SATA), Firewire, etc. These interfaces are used in a number of applications for computers and other electronic devices.

USB, for example, is a commonly-used interface standard that allows data communication between a host and one or more peripheral devices. The host controller communicates with the peripheral devices using one or more USB ports of the host connected to the peripherals. Additional peripheral devices can be connected in series to the host by using USB hub devices, where each hub typically has multiple downstream ports to connect multiple devices. Communication in a USB interface can use a variety of formats and speeds. In general, "low speed" has a data transfer rate of 1.5 Mbit/s, "full speed" has a data transfer rate of 12 Mbit/s, "high speed" has a data transfer rate of 480 Mbit/s, and "superspeed" has a data transfer rate of 5 Gbit/s.

The USB specification mandates a strict control over the maximum delay each component of the USB system can take to respond to an incoming packet (for a host, hub, or peripheral) or to propagate the incoming packet (for a hub only). In particular, there is a critical timing parameter named Bus Turn-around Time, which is essentially the time delay measured from the end of a packet leaving the host (or other transmitter) to the beginning of the packet generated by a device as an answer to the host packet. This time is the worst case round trip delay plus the maximum device response delay. A maximum Bus Turn-around Time is specified for USB connections. If the answer packet is not received by that maximum Bus Turn-around Time, the host times out, considers the packet transmission to have failed, and discards the packet as being late.

The host changes the Bus Turn-around Time based on the number of hubs enumerated in a connected series between the host and a connected device, assuming for each of the hubs a maximum cable length of 5 meters (26 ns of delay time for a signal) between hub and upstream component, and a maximum inherent delay through the hub of 36 USB high-speed (HS) bit time (18 ns of delay time). The specification allows for a maximum of 5 hubs connected in series (in a row), corresponding to a maximum distance of 30 meters from the host to the peripheral(s) that is connected to the last hub in the row.

A problem may occur in cases in which the maximum delay time over a segment of USB cable is higher than 26 ns. For example, this may occur when using longer cables or cable extensions in the need to connect a peripheral device at a distance greater than the maximum distance of the specification. In such cases, longer cables typically will not operate correctly at least because they exceed the maximum delay time. This additional delay can be compensated for by connecting one or more additional hubs in series between host and destination device, as long as the maximum number of hubs is not exceeded. Each additional hub causes the host to allocate a greater amount to the response delay budget. However, adding a hub is an expensive solution, since each hub includes several hardware components including multiple downstream ports, transaction translators, re-route logic, and re-timing circuitry. Each added hub may thus be highly redundant if the only reason for adding the hub is to make use of its delay budget and resulting distance extension ability.

These and other limitations of the prior art will become apparent to those of skill in the art upon a reading of the following descriptions and a study of the several figures of the drawing.

SUMMARY

A communication interface hub, set forth by way of example and not limitation, includes multiple ports, where one of the ports is an upstream port operative to be in direct and/or indirect communication with a host and at least one other of the ports is a downstream port operative to be in direct and/or indirect communication with at least one device. At least one hub core is coupled to the ports and implements at least one physical hub, and at least one virtual hub core is coupled to the ports and implements at least one virtual hub. In some examples, the upstream port is operative to be in communication with the host via a direct connection or connection to one or more intervening hubs, and the downstream port is operative to be in communication with the at least one device via a direct connection or connection to one or more intervening hubs. The virtual hub is detectable as at least one physical hub by the host to cause the host to allocate an additional time delay in waiting for responses to signals output by the host. In some embodiments, the additional time delay is budgeted to provide a greater physical connection distance between the host and the at least one device.

In another communication interface hub, set forth by way of example and not limitation, a first hub core is coupled to an upstream port and a last hub core is coupled to a downstream port. In some examples, the upstream port is operative to be in communication with the host via a direct connection or connection to one or more intervening hubs, and the downstream port is operative to be in communication with the at least one device via a direct connection or connection to one or more intervening hubs. A virtual hub core is coupled between the first hub core and the last hub core, the virtual hub core implementing at least one virtual hub. The virtual hub is detectable as at least one physical hub by the host to cause the host to allocate an additional time delay in waiting for responses to signals output by the host.

A method for providing a hub for a communication interface, set forth by way of example and not limitation, includes determining that a connection of an interface hub to a host has occurred via a communication interface. Using the interface hub, at least one additional hub is emulated to the host, the at least one additional hub including at least one virtual hub. In some embodiments, the detection of the at least one virtual hub causes the host to allocate an additional time delay in waiting for responses to signals output by the host, and the additional time delay is used to extend a distance between the host and the at least one device connected to the downstream port of the interface hub.

These and other combinations and advantages and other features disclosed herein will become apparent to those of skill in the art upon a reading of the following descriptions and a study of the several figures of the drawing.

BRIEF DESCRIPTION OF THE DRAWINGS

Several examples will now be described with reference to the drawings, wherein like components are provided with like reference numerals. The examples are intended for the purpose of illustration and not limitation. The drawings include the following figures.

DETAILED DESCRIPTIONS

In the following descriptions, interface components will be discussed with reference to the specific examples such as the USB interface standard. These examples are not to be seen as limiting but, rather, illustrative of the general concepts set forth herein.

Figure 1:
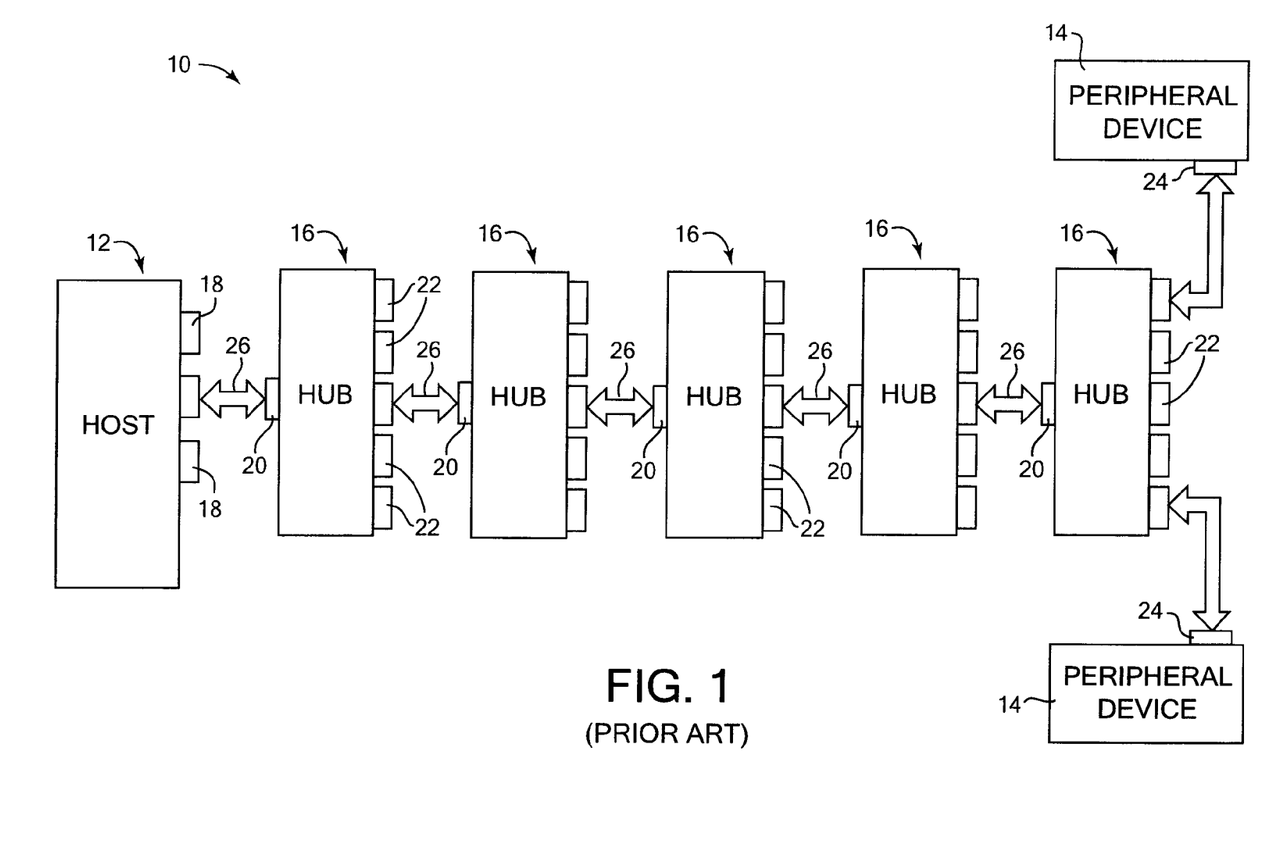
FIG. 1 is a block diagram of a system including a standard Universal Serial Bus (USB) communication interface.

FIG. 1 is a block diagram of a system 10 including a standard Universal Serial Bus (USB) communication interface. System 10 includes "devices" such as a host 12, one or more peripheral devices 14, and one or more hubs 16. Host 12 includes a host controller that directs communications over the interface and includes a host hub ("root hub") providing one or more standardized ports 18 which each allow connection of and communication with a device such as a peripheral or hub to the host 12. A peripheral device 14 can be connected directly to a port 18 for communication with host 12, or can be connected to a hub 16 which is connected to a port 18 or to another hub 16 to allow communication between host 12 and peripheral 14 through the hub(s) 16. In some examples, a host 12 can be a desktop computer or similar device, and peripheral devices 14 can include devices such as printers, hard drives or other storage drives, electronic devices, or other peripherals.

Hubs 16 can be connected between the host 12 and one or more peripherals 14. Each hub 16 can include a standardized input port 20 and a plurality of standardized output ports 22. A peripheral 14 can be connected to any of the hub output ports 22 by a standardized port 24 on the peripheral 14, to establish a connection with the host 12. The host 12, hubs 16 and peripherals 14 are typically connected to each other using hops (e.g., wires or cables) 26 which direct the communication between interface devices. Multiple peripherals 14 can be connected to one hub 16, allowing a greater number of devices to be connected to host 12 than the number of host ports 18.

Host 12 controls the flow of data traffic to the one or more hubs 16 and/or to destination peripherals 14. The host controller polls the bus for traffic, and the slowest connected device sets the bandwidth of the interface. The host can communicate with one downstream device at a time. The host sends out a data packet or command intended for a downstream device, and each hub 16 broadcasts the data packet or command from the host to all of the active devices downstream from that hub. An address in the data packet specifies the device intended to receive the command, and the receiving device sends a reply data packet back to the host.

Interface standards such as USB typically have response times specified for the interface. For example, in the USB standard there is defined a maximum allowed round-trip response time (Bus Turn-around Time) ("response time" or "delay" as referred to herein) for a command to propagate from the host to the furthest downstream device and return to the host, i.e., a response delay including the worst case round trip delay plus the maximum device response delay. This maximum allowed round-trip delay is, for example, about 192 bit times (HS) or 6.5 bits times (FS or LS) for USB 2.0 interfaces. If a command is sent by the host and the host expects a response from a downstream device, the host will wait and not send any further data until a response is received from that device or the allowed response time has expired without receiving a response. If such a command is unanswered by the device response within the allowed response time, the host considers the command to be lost and will either re-send the command or stop sending commands or data to the device in the assumption that it is not functioning properly.

Some specifications provide for a maximum total length of each cables 26 between the host 12 and a peripheral 14 to meet the maximum allowed round-trip response time for sending a command and receiving its response. For example, for USB 2.0, the maximum length of a connecting cable is 5 meters (16.4 feet), allowing about 26 ns of maximum response time for each cable. In the USB 2.0 specification, up to 127 devices (including hubs and peripherals) can be connected to the host controller in the host 12.

Some standards also specify that a maximum number of hubs can be connected between host 12 and any peripheral 14, and that each such hub has an inherent maximum delay which causes the host to increase the allowed response time that the host will wait for a response before timing out. A host 12 determines the maximum allowed response time from the number of hubs 16 connected in series between host and peripheral device. For example, for USB 2.0, a maximum of five hubs can be connected in series between host and peripheral, as shown in FIG. 1, and a maximum inherent delay of 36 USB high speed (HS) bit times (about 18 ns) is allowed for each hub. Delays from maximum number of hubs plus delays from connecting cables corresponds to a maximum acceptable delay per cable of 44 ns. Assuming five hubs and five cables, a maximum of 25 meters distance is allowed from the host to a fifth hub connected in series, plus another 5 meters for the cable connecting to the peripheral device, to total a maximum distance of 30 meters allowed between host and peripheral. This maximum may be too short for some applications, as well as expensive if additional hubs are used only to extend the maximum distance.

Figure 2:
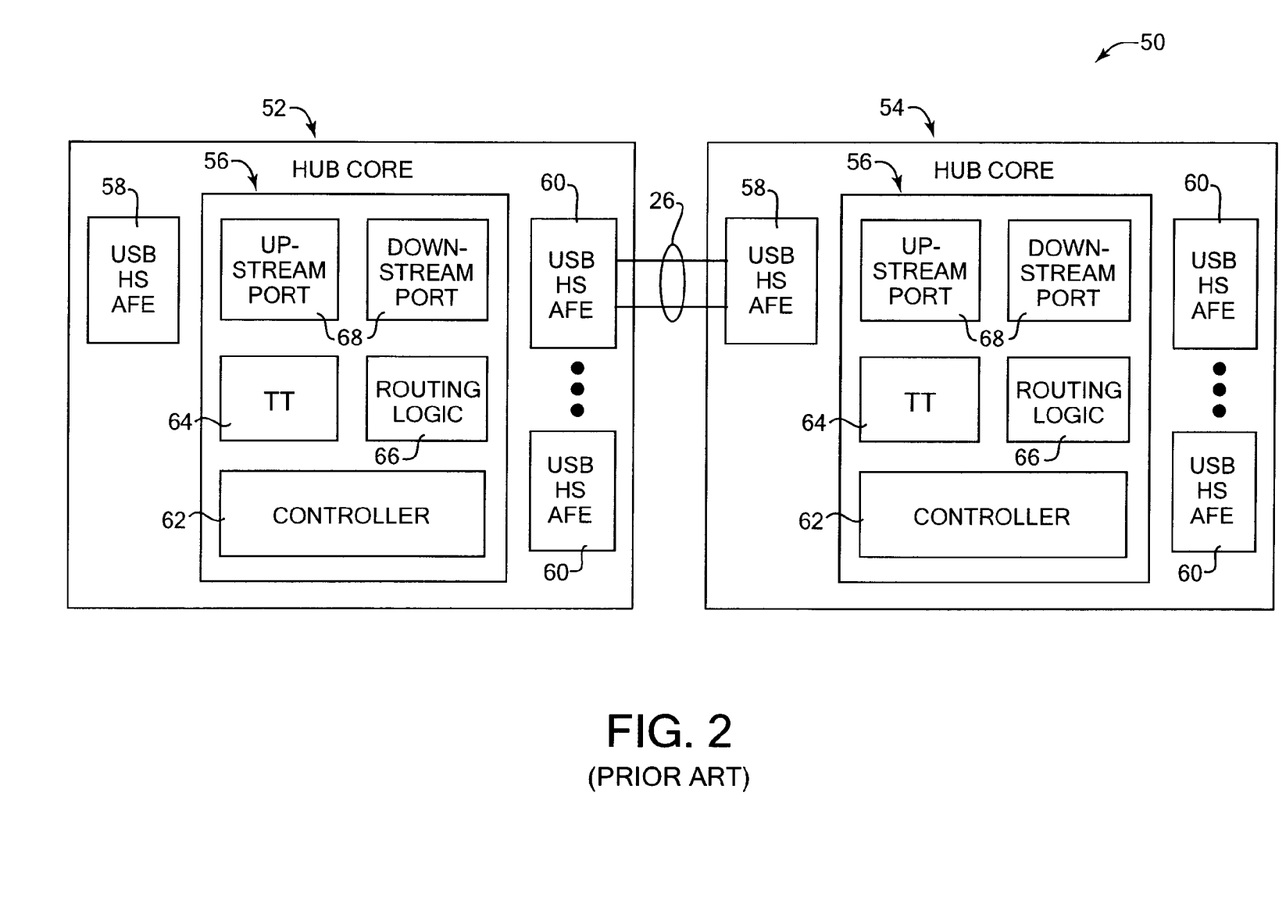
FIG. 2 is a block diagram of a hub system including standard hubs used in a USB communication interface.

FIG. 2 is a block diagram of a hub system 50 including standard hubs used in a USB communication interface. For example, the USB 2.0 communication interface is described in detail in the Universal Serial Bus Revision 2.0 Specification, which is incorporated herein by reference. Only the USB components relevant to the embodiments herein are shown and described. A hub 52 is connected to a hub 54 by a differential cable 26, where the hub 52 is connected further "upstream," i.e., closer to the host 12, than hub 54 which is further "downstream" away from the host, e.g., toward a connected peripheral. In the USB 2.0 standard, there is one destination port active for each upstream port at any time, such that the host can only communicate with one downstream device at a time.

Each hub 52 and 54 includes a hub core 56 which is connected to a high-speed (HS) analog front-end (AFE) 58 at an upstream side, and connected to multiple AFEs 60 at a downstream side. The AFE 58 can be connected to an input port 20 that receives a cable from an upstream hub 16 or host 12 as shown in FIG. 1. The AFEs 60 can each be connected to a corresponding output port 22 of the hub to be connected via a cable to another hub or a peripheral. In the example shown in FIG. 2, an AFE 60 of hub 52 is connected to the AFE 58 of hub 54. Each AFE 58 and 60 includes the appropriate analog components to receive and send high-speed, full-speed, and low-speed signals over the connected port and cable according to the USB interface protocol.

The hub core 56 includes hub controller 62, which is used for various control functions of the hub, including receiving configuration commands from the host 12 and maintaining communication with the host. The controller 62 tells the host what type of hub it controls, the number of input and output ports, the data transfer rates allowed by the hub (Low Speed (LS), Full Speed (FS), High Speed (HS)), etc. Some data traffic from the host 12 is specifically used to configure a particular hub 52 or 54, where the controller 62 receives the host configuration commands and implements them to configure the hub it controls. For example, hub-specific status and control commands permit the host to configure a hub and to monitor and control its individual downstream-facing ports. In the USB interface standard, the controller 62 implements an endpoint, "endpoint 0," which is a logical entity connected to the host by a pipe (connection), and is used to handle all hub-specific control transfers. The controller 62 also includes an "endpoint 1 IN" endpoint for signaling notifications of changes in the status of the hub's downstream ports to the host 12.

The transaction translator (TT) 64 is included in the hub core to respond to high speed (HS) split transactions and translate them (if needed) into full speed (FS) or low speed (LS) transactions compatible with any full-speed or low-speed devices attached on downstream-facing ports of the hub. The TT 64 supports all USB transfer types, such as bulk, interrupt, control, and isochronous.

Port routing logic 66 is included in the hub core to route high-speed packets between particular downstream ports and the upstream port, as well as distribute low-speed and full-speed packets between downstream ports and the transaction translator 64. For example, the port routing logic 66 can route traffic in either direction, such as propagating traffic received at the AFE 58 to the required downstream port AFE 60 of the hub, and/or collecting traffic from a downstream port AFE 60 and propagating the traffic to the upstream port via AFE 58 or to the transaction translator 64.

Upstream and downstream ports logic 68 control all the USB-specific signaling detected by and generated by the hub. For example, the logic 68 handles detection and generation of the USB reset and USB suspend/resume signals. The downstream portion of the logic 68 can include downstream finite-state machine (FSM) logic that is responsible for device connection and device speed detection, suspend/resume signaling, and USB reset signaling.

Each hub re-clocks data to provide its own locally-clocked output data (e.g., to control jitter) in upstream and downstream directions to provide a signal having the proper timing. The upstream and downstream ports logic 68 each include a clock and data recovery (CDR) block to recover the clock signal based on edges of the data stream, as well as an elasticity buffer to buffer the signal as needed for clock recovery.

The components of each hub 52 and 54 add to the propagation delay of signals through the hub due to processing and routing of signals. Some components add even more significant delay. For example, the elasticity buffer can contribute at least 12 bit times to propagation delay.

Figure 3:
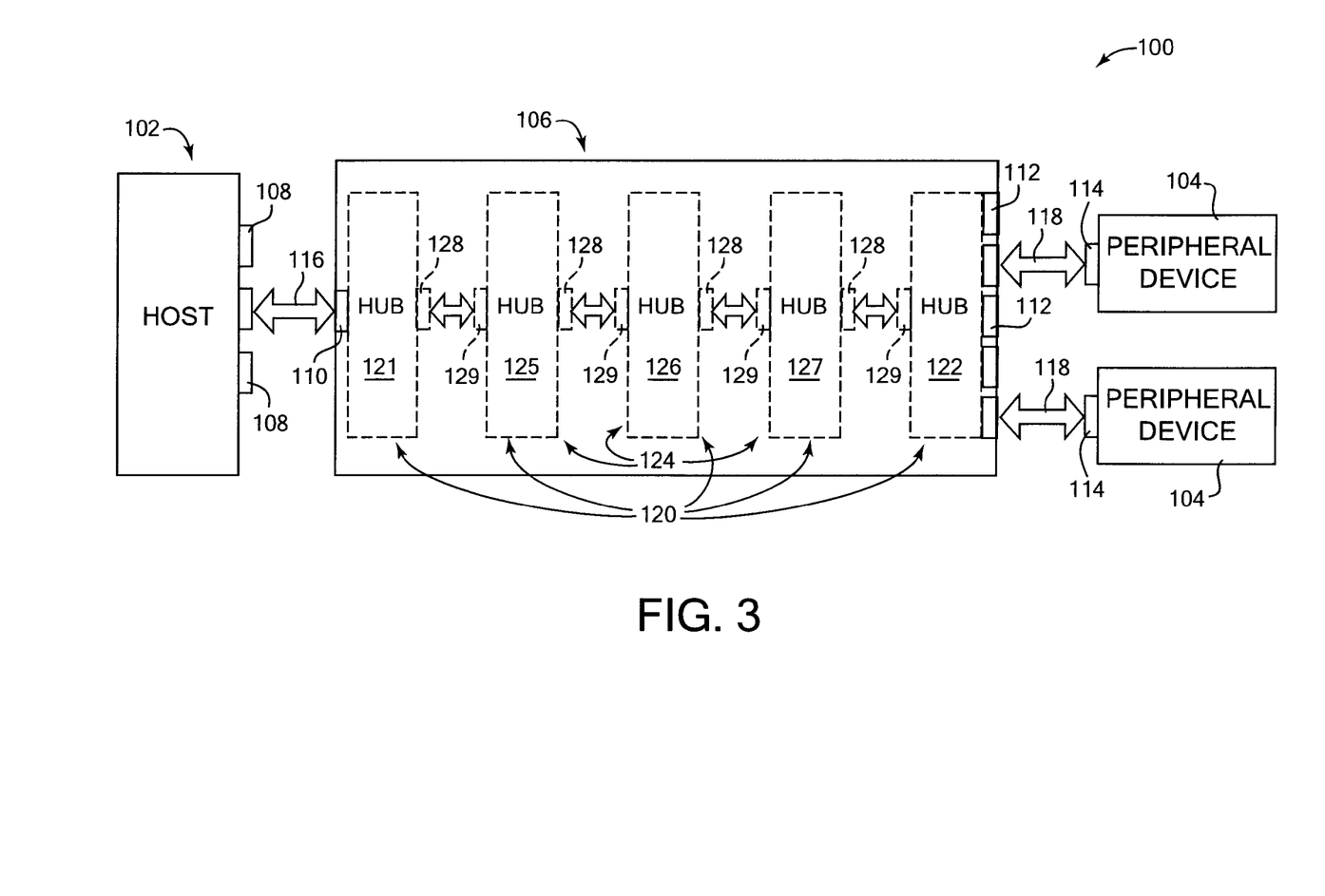
FIG. 3 is a block diagram illustrating a system including an embodiment of an interface hub system according to features described herein.

FIG. 3 is a block diagram illustrating a system 100 including an embodiment of an interface hub system according to features described herein. System 100 includes a host 102, one or more peripheral devices ("peripherals") 104, and a hub system 106. Host 102 includes a host controller that directs communication of information (such as commands and data) over a standardized communication interface to and from other devices on the interface. The standardized communication interface can be USB, such as USB 2.0 in the examples described herein. Other standardized communication interfaces can be used in other embodiments, which include similar hub and peripheral functionality.

The host 102 includes a root hub providing one or more ports 108 of the host which allow connection of and communication with peripherals or hubs to the host 102 via the communication interface. One or more peripherals 104 can each be connected directly to a port 108 for communication with host 102, or a hub system 106 can be connected between host 102 and a peripheral 104 to allow communication of host 102 and peripheral 104 through the hub system 106.

In some examples, host 102 can be a desktop computer, laptop computer, workstation, server, cell phone or other portable electronic device, or other device communicating with peripherals over the interface. Peripheral devices 104 can include devices such as printers, scanners, hard drives or other storage drives, optical disk drives, cameras, visual display devices, audio output devices, data conversion devices, user interface controllers, game controllers, computers, portable phones, flash memory drives, network transmitters and/or receivers, or any similar device communicating with a host.

The devices of the system 100 (host, peripherals, hubs) are connected via hops such as cables, wires, or other physical connections, referred to as cables herein. A cable 116 connects a port 108 of host 102 to an upstream port 110 of hub system 106, and each cable 118 connects a downstream port 112 of the hub 106 to an associated input port 114 of one of the peripheral devices 104. In the described USB embodiment, cables 116 and 118 are USB cables having a predetermined maximum length. For example, in the USB 2.0 specification, cables must be 5 meters or less. This can restrict the use of some peripheral devices 104 which may need to be located a longer distance from the host 102 than the maximum length of interface cables allows.

Hub system 106 is connected between the host 102 and the peripherals 104. The hub system 106 includes one or more physical upstream ports 110 in at least one of direct and indirect communication with the host 102, and one or more physical downstream ports 112 in at least one of direct and indirect communication with one or more peripherals 104. Upstream ports 110 can be connected directly to the host 102 by a cable, or can be connected to the host 102 indirectly via one or more hubs connected by one or more cables. Likewise, downstream ports 112 can be connected directly to peripherals 104 by cables, or can be connected to peripherals 104 indirectly via one or more hubs. By "direct communication", it is meant that a port is directly connected to, for example, a host or peripheral, and by "indirect communication" it is meant that a port is coupled to, for example, a host or peripheral via an intermediary system, such as another hub. A peripheral device 104 (or other hub in some embodiments) can be connected to each of the downstream ports 112. In other embodiments, multiple hosts 102 can be connected to one or more peripheral devices 104 by using a hub system 106 having multiple upstream ports 110.

Hub system 106 also implements multiple hubs 120 that are seen by the host as multiple actual standard hubs connected in series, but which at least some of which are virtual hubs. Herein, a "virtual hub" is a hub that is detectable by the host as a connected physical hub but is not an actual physical hardware hub having its own associated physical ports allowing connections by physical devices. In some embodiments, a virtual hub also does not have most of the other physical components used in standard hubs for the interface, such as analog front ends, port logic, transaction translator, and routing logic. In some embodiments, the first hub 121 and the last hub 122 can be considered at least partially physical hubs provided with at least some physical hub components such as upstream or downstream physical ports (and may also include virtual ports and so may be considered partially a virtual hub). The other hubs 124 (e.g., second hub 126, third hub 127, and fourth hub 128) are fully virtual hubs that are emulations of physical hubs. Different embodiments can include different numbers of hubs 120. The described example is for the USB 2.0 interface specification and so includes five hubs as the maximum number of hubs in the USB standard. Less than five hubs 120 can be used in other embodiments.

First hub 121 in the hub system 106 includes the physical upstream port 110 and has a virtual downstream port 128. Middle hubs 125, 126, and 127 include virtual upstream ports 129 and virtual downstream ports 128. Last hub 122 includes a virtual upstream port 129 and physical downstream ports 112. The host 102 can communicate with any of the hubs 120 as if they were actual hubs. The virtual ports 128 and 129 are implied connections between the virtual hubs which are assumed to be present as standard USB ports by the host 102.

Hub system 106 emulates the connection of multiple hubs in series without connecting additional physical hubs. The hub system 106 fools the host 102 into detecting all the hubs 120 as multiple standard hubs connected in series, even though only one hub system 106 with greatly reduced components is connected. The hubs 120 provide a delay function equivalent to the connection of the same number of physical hubs. For example, the detection of multiple hubs causes the host 102 to allocate a greater amount of response time for which it will wait for a response from a device after sending a packet, and therefore allows an extension of distance in the connection between host and peripheral, without requiring all the physical components required for multiple hubs shown in FIG. 2. These features are described in greater detail below with respect to FIGS. 4-7.

Figure 4:
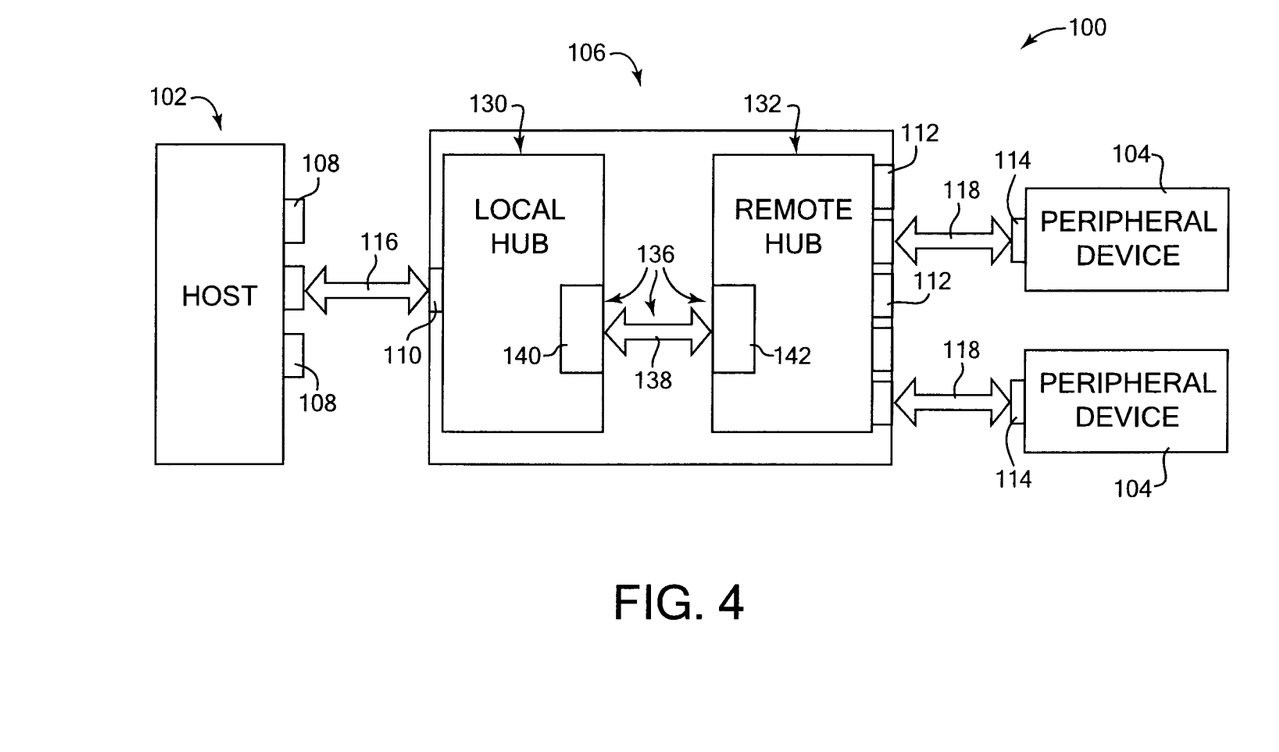
FIG. 4 is a block diagram of one example of the system of FIG. 3 including an implementation of the interface hub system having a cable extension feature.

FIG. 4 is a block diagram illustrating system 100 including an example embodiment of an implementation of the interface hub system having a cable extension feature. System 100 includes host 102, peripherals 104, and hub system 106 as described above for FIG. 3.

In the described example embodiment, hub system 106 includes a local hub portion 130 that is connected to a remote hub portion 132 by a hub communication interface 136. The hub system 106 includes one or more upstream ports 110 and one or more downstream ports 112. Local hub portion 130 includes the one or more input or upstream ports 110 connected to the host 102. Remote hub portion 132 includes one or more output or downstream ports 112 connected to peripherals 104 (and/or connected to additional hubs, in some embodiments). In other embodiments, multiple hosts 102 can be connected to one or more peripheral devices 104 by using a hub system 106 having multiple upstream ports 110.

The hub communication interface 136 of hub system 106 allows communication between sub-components of the hub system 106. The link 138 of the interface 136 can be made longer than the maximum length of cables allowed by the standard interface of the host and peripherals, thus gaining extended distance between host and peripheral. However, in some interface standards, an extended cable for link 138 may not function properly due to other characteristics (e.g., minimum voltages, etc.). Therefore, the interface 136 can be a different interface standard than the standard used for the communication interface between the host 102 and peripheral device 104. The standard for hub communication interface 136 can allow longer distances than the host-peripheral interface standard, and therefore allow peripheral devices to be connected at a longer distance from the host 102 than allowed by the host's interface.

For example, USB embodiments may not allow much greater lengths of cables between devices, and the hub communication interface 136 can be an Ethernet interface to implement one or more of the Ethernet communication standards 10BASE-T, 100BASE-T, 1000BASE-T, and/or 10GBASE-T, which allow much greater cable distances. Other communication interfaces can also be used for hub interface 136. The local hub portion 130 and the remote hub portion 132 each include interface components 140 and 142, respectively, to enable communication across a hub communication link 138, which is a cable or other connection as required for the hub communication interface. For example, interface components 140 and 142 can each include an Ethernet transceiver as well as clock and data recovery (CDR) and elasticity buffer (EB) blocks, as is well known to those of skill in the art of Ethernet communication. In one example, the interface components 140 or 142 receive an Ethernet signal with an Ethernet transcevier and use a CDR block and elasticity buffer to recover a clock signal from the signal, and convert the Ethernet signal to a USB-compatible signal to the components of the local hub portion 130 or remote hub portion 132. In other embodiments, the local hub portion 130 and remote hub portion 132 are included in a single hub enclosure and no cable need be provided as link 138.

The other components of hub system 106 are described in greater detail below with respect to FIGS. 5-6.

The use of a different standard interface for hub communication interface 136 allows longer distances to be provided between host and peripheral than in the standard interface specification, while still allowing the components to use the standard interface (such as the USB 2.0 specification). For example, in some embodiments, such as using a 1000BASE-T Ethernet interface 136, a cable acting as link 138 can be about 30 meters in length such that the hub system 106 provides an equivalent delay to the maximum-delayed USB hub configuration downstream of an initial hub, i.e., five hubs connected in series. With USB cables connected as cable 116 and cable 118 (in this example) and each providing 5 meters of length, this allows a distance of 40 meters to be provided between the host 102 and a peripheral 104 with the hub system 106 connected between them. In contrast, a standard USB system such as shown in FIG. 1 requires five hubs between host and peripheral device, and in such a configuration a maximum of 30 meters is allowed due to the limitations of each USB cable provided between each device of the interface system. Furthermore, the hub system 106 is implemented using a greatly reduced amount of hub components (detailed below) as compared to a standard USB hub, which greatly reduces the expense of the system as compared to the 5-hub system of FIG. 1.

Figure 5:
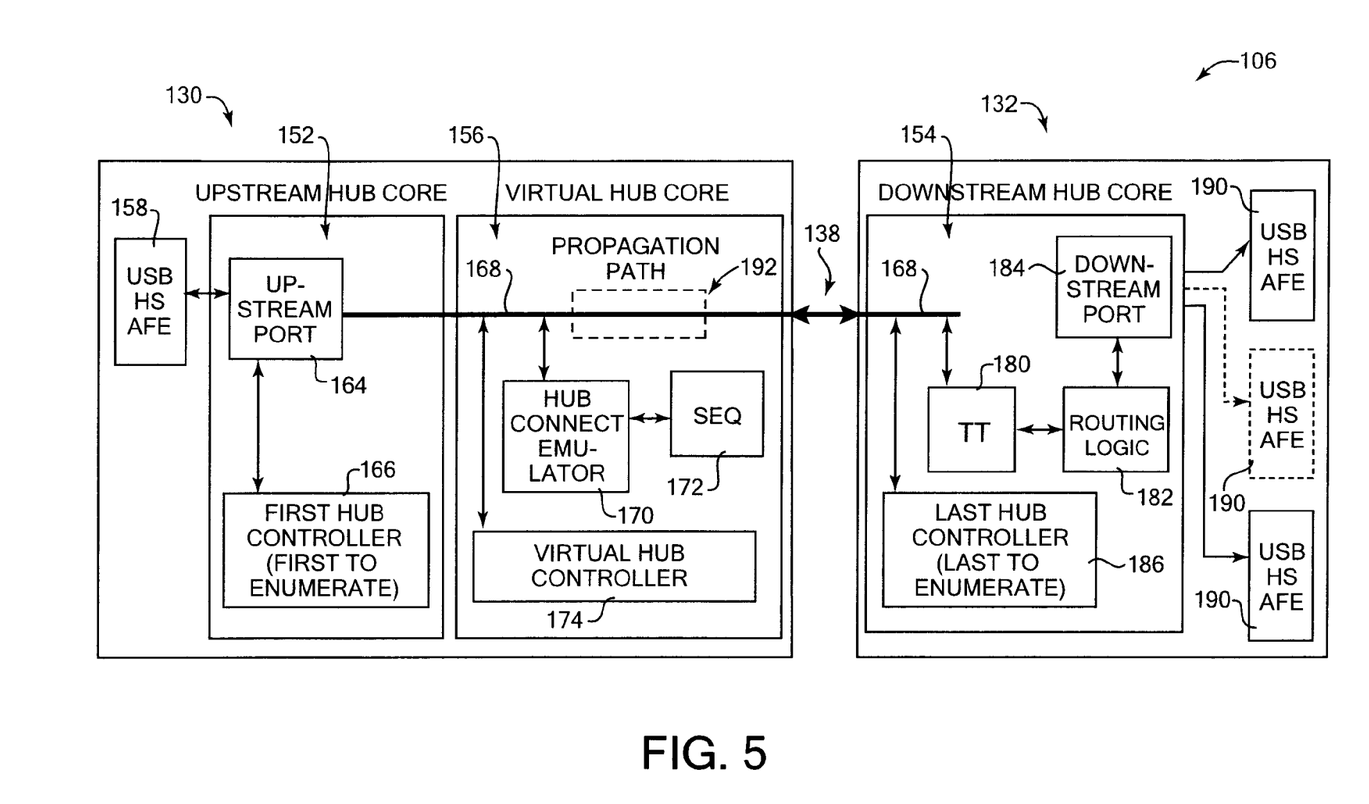
FIG. 5 is a block diagram of one example embodiment of the hub system of FIG. 3.

FIG. 5 is a block diagram illustrating one example embodiment of the hub system 106 of FIG. 3, set forth by way of example and not limitation. Hub system 106 is described in the context of a USB 2.0 interface in this example. Standard functions and operation of the USB 2.0 communication interface is described in the Universal Serial Bus Revision 2.0 Specification, which is incorporated herein by reference. Other standard components of USB hubs are assumed to be included in hub system 106 and are not shown or described herein.

As described above with reference to FIG. 4, the hub system 106 can include local hub portion 130 that is coupled upstream closer to the host 102, and remote hub portion 132 that is coupled downstream closer to the peripheral devices 104. The hub communication link 138 can be coupled between the local hub portion 130 and the remote hub portion 132 (components of the hub communication interface 136 are not shown in FIG. 5).

Hub system 106 includes an upstream hub core 152, a downstream hub core 154, and a virtual hub core 156 to emulate the connection of multiple hubs in series. In this described embodiment, the upstream hub core 152 and downstream hub core 154 implement at least one physical hub, and the virtual hub core 156 implements one or more virtual hubs (or portions thereof) which are seen by the host as actual hub devices. For example, the upstream hub core 152 provides a upstream-end portion of a physical hub and the downstream hub core 154 provides a downstream-end portion of a physical hub, where multiple hubs can be seen by the host from these cores due to the function of the virtual hub core 156. In some embodiments, the upstream hub core 152 interfaces with the host for functions of a first hub, the virtual hub core 156 interfaces with the host for functions of the one or more virtual hubs, and the downstream hub core 154 interfaces with the host for functions of a last hub.

In some embodiments, such as the example shown in FIG. 5, the local hub portion 130 includes the upstream hub core 152 and the virtual hub core 156, and the remote hub portion 132 includes the downstream hub core 154. The communication link 138 between local hub portion 130 and remote hub portion 132 is connected to appropriate interface components as shown in FIG. 4, such as transceivers. In other embodiments, the local hub portion 130 and remote hub portion 132 can include different components than shown in FIG. 5. For example, the virtual hub core 152 (or some components of the virtual hub core 152) can be provided in the remote hub portion 132. Or, some components of the remote hub portion 132 can be provided in the local hub portion 130. The components of the local hub portion 130 can be integrated in a single system, such as a single substrate made of silicon or other semiconductor, or a single printed circuit board (PCB)), or the components or subsets thereof can be provided on separate substrates. The virtual hub core 156 can be implemented as a separate integrated circuit from the components of the upstream hub core 152, or can be integrated with the upstream core components in other embodiments. Similarly, the components of the remote hub portion 132 can be integrated or provided separately in other embodiments. In an alternate embodiment, the remote hub portion 132 can include a bi-directional USB repeater to drive signals.

The local hub portion 130 includes a number of different components in the embodiment shown. Analog Front End (AFE) 158 is included in the local hub portion 130 and provided at the upstream port of the hub system 106 to connect to an interface cable and directly to the host 102 (or other upstream devices, indirectly connecting to the host 102). The AFE 158 includes appropriate analog components to receive and send signals over the connected port and cable according to the implemented interface protocol. An HS AFE is shown in FIG. 5 as AFE 158 for simplicity, and is assumed to include lower speed USB functionality as well. For example, in a USB 2.0 implementation, the AFE 158 includes three differential driver/receivers for low speed (LS), full speed (FS), and high speed (HS) data rates of the interface, as well as single-ended drivers and receivers.

Upstream hub core 152 is provided at the upstream side of the hub 106 and is connected to the upstream AFE 158. Upstream hub core 152 includes a subset of the components used in a standard hub of the interface. For example, upstream core 152 does not include components such as downstream AFEs and downstream port logic, as well as transaction translators and routing logic. Core 152 includes upstream port logic 164 which provides, according to the implemented communication interface and protocol, decoding of data received by the hub system 106 from the host 102 (or other upstream device) and encoding of data sent out by the hub system 106 to the host 102 (or other upstream device).

In the described embodiment, a first hub controller 166 is also included in upstream hub core 152. The first hub controller 166 receives configuration commands from the host 102 and maintains communication with the host via upstream port logic 164. First hub controller 166 controls functions for a first functional hub of the hub system 106, which is the first hub seen by the host 102 in the series of connected hubs emulated by the system 106. The first hub controller 166 receives commands from the host 102 for configuring or otherwise instructing the first hub.

First hub controller 166 includes a function of controlling enumeration of the first hub 121 of the hub system 106 to the host 102. Enumeration is the detection and identification of devices by the host, and includes determining the device(s) that have been connected to the interface bus and the characteristics of those devices, such as class of product, power consumption, number and type of endpoint(s), etc. It also includes the host assigning each device an address on the interface bus and enabling a configuration allowing the device to transfer data on the bus. For example, during enumeration, the first hub controller 166 tells the host information such as what type of hub it controls, the number of input and output ports, the data transfer rates allowed by the hub (Low Speed (LS), Full Speed (FS), High Speed (HS)), etc.

Hub system 106 appears to the host 102 as multiple hubs. When the hub system 106 is connected to the host 102 or other upstream device, the first hub controller 166 enumerates such that the first hub is configured. The virtual hub core 156 then signals additional device attachments to the host 102 to indicate that other hubs of the hub system 106 that are downstream of the first hub controller 166 are connected to the first hub 121. This causes the host to begin the enumeration process for the each of the downstream hubs. This process is described in greater detail below.

Virtual hub core 156 is connected to a pass-through line 168 that is connected to the upstream port logic 164. The virtual hub core 156 emulates one or more virtual hubs such that the virtual hubs appear to the host as actual physical hubs connected in series to the first hub controlled by upstream hub core 152. For example, in the USB standard, five hubs can be connected in series, and the virtual hub core 156 can emulate one to three hubs 125, 126, and 127 connected in series after the first hub 121 controlled by the upstream hub core 152, as well as functions associated with the other two hubs 121 and 122 (in this embodiment, the last hub 122 in the series is indicated to be connected by the virtual hub core 156 but is controlled by downstream hub core 154). In some embodiments, components of the virtual hub core 156 can be provided in one or more processors, processing circuitry, integrated circuits, or other circuits. In other embodiments, the components of the virtual hub core 156 can be included in other processors or circuits implementing other functions of the hub system 106.

In the described embodiment, virtual hub core 156 includes a hub connect emulator 170, a sequence function block 172, and a virtual hub controller 174. This is one example of the components of the virtual hub core; other configurations of components or functionality can be used in other embodiments, such as the controller 174 including the other two components 170 and 172.

Hub connect emulator 170 indicates a new connection to the host of one or more virtual hubs emulated by the virtual hub core 156. The emulator 170 can also indicate a connection of the partially physical last hub 122. For example, the hub connect emulator 170 provides a connection emulation of a virtual hub 125 that is already connected to the first hub 121 at or after the enumeration of the first hub to the host 102. The hub connect emulator 170 also provides a connection emulation of a virtual hub (or last hub) that has been connected to a just-previous virtual hub that has finished enumerating to the host. In some embodiments, for example, the hub connect emulator 170 can set a signal which mimics a signal that an actual hub device would create when a new device is connected to one of its downstream ports, and which informs the host to establish communication to and command enumeration of that new device, where the new device is a virtual hub in this case.

The sequence function block 174 communicates with the hub connect emulator 170 and controls the emulator 170 to signal a connection of a virtual hub to the first hub or to a previous virtual hub, as an emulation of the connection of an actual hub. For example, the sequence function block 174 knows how many hubs 120 are to be implemented in the hub system 106 (e.g., based on predetermined preference or settings, or user input provided by input device on the hub system or from the host), and can direct the hub connect emulator 170 to provide an emulated connection signal (such as an interrupt endpoint data signal) for the host at the appropriate time to simulate another hub connected to a downstream port. The sequence function block 174 sequentially controls the presentation of a connect signal to the host for each hub 120 in the hub series being implemented. One example of functionality included in the sequence function block 174 is described below with respect to FIG. 7. In some embodiments, the sequence function block 174 can sequentially present all the later hubs of the system 106 to the host at the time of first hub connection, as if all these hubs were already connected to the first hub when the hub system 106 is connected to the host. In other embodiments, sequence function block 174 can control the emulated connect signals for hubs that are later "connected" to the first hub after the first hub is connected to the host 102, e.g., at particular points in time after first hub enumeration and configuration.

The virtual hub controller 174 is connected to the line 168 in virtual hub core 156, and provides the hub controller functionality (similar to first hub controller 166) for all the virtual hubs emulated by the virtual hub core 156, such as virtual hubs 125, 126, and 127. For example, the virtual hub controller 174 manages the traffic between the host and each virtual hub. When the host needs to communicate with any of the virtual hubs, the traffic is routed to the virtual hub controller which responds in the appropriate way. Thus, if enumeration of a virtual hub is commanded by the host, the virtual hub controller controls the enumeration functions. The virtual hub controller also receives and implements commands from the host for configuring the virtual hubs as well as commanding other functions of the virtual hubs.

The virtual hub core provides a propagation path 192 on line 168 which appears to the host as routing through multiple hubs but in actuality is provided in the single hub system 106. The hub system 106 includes only a few additional components beyond that of a single standard physical hub (such as shown in FIG. 2) and thus hub system 106 includes no actual multiple-hub delay for signals communicating across the path 192. Thus, the delay saved from the use of virtual hubs and connection emulation in the system 106 can be rebudgeted for other uses, such as the lengthening of the link 138 in communication interface 136 between the local hub portion 130 and the remote hub portion 132.

Downstream hub core 154 is connected to the virtual hub core 156. The virtual hub core 156 provides downstream traffic tunnelling by routing pass-through traffic intended for peripheral devices 104 along line 168, where line 168 is connected to the downstream hub core 154. In some embodiments, the line 168 is connected from virtual hub core 156 in the local hub portion 130 to downstream hub core 154 in the remote hub portion 132 by a different communication interface 136, such as Ethernet, as described above with reference to FIG. 4.

Downstream hub core 154 includes a subset of the components used in a standard hub of the interface. For example, downstream hub core 154 includes at least one transaction translator 180, port routing logic 182, downstream port logic 184, and last hub controller 186, but not upstream AFEs or upstream port logic. Transaction translator 180 receives the pass-through high speed traffic on line 168 and translates the high speed traffic into full speed or low speed traffic for any devices connected to the downstream ports 112 that operate using the slower-speed traffic. The transaction translator 180 also receives traffic from downstream devices and passes the traffic through to line 168 or translates low-speed or full-speed into high-speed traffic if upstream devices operate at high speed.

The port routing logic 182 receives downstream-directed traffic from the transaction translator 180 and routes the traffic to the appropriate downstream ports via the downstream port logic 184, and/or receives upstream-directed traffic from the downstream port logic 184 and routes the traffic to the transaction translator 180. The downstream port logic 184 includes logic connected to each downstream port and provides, according to the communication protocol, decoding of data received by the hub system 106 from downstream devices and encoding of data sent out by the hub system 106 to the downstream devices. The downstream port logic 184 can include downstream finite-state machine (FSM) logic that is responsible for device connection and device speed detection, suspend/resume signaling, and USB reset signaling on each downstream port.

The last hub controller 186 acts as the hub controller of the last hub 122 implemented on the hub system 106 in the series of connected hubs. The last hub 122 includes all the physical downstream ports 112 of the hub system 106, to which peripherals 104 are connected. The last hub controller 186 communicates with the host via the line 168 to respond to commands received from the host that are intended to control functions of the last hub of the system 106. In some embodiments, however, the last hub's connection can be handled by the virtual hub core. For example, the connection of the last hub 122 can be signaled to the host by the hub connection emulator 170 and the previous virtual hub's downstream port can be reset by the virtual hub controller 174. Then the last hub controller 186 can receives host commands for enumerating the last hub, and controls other functions of the last hub.

AFEs 190 are provided at the downstream ports in the remote hub portion 132 of the hub system 106 to connect to interface cables and downstream devices. AFEs 190 are connected to the downstream port logic 184 and are similar to the upstream AFEs 158.

The single system of hub system 106 can be provided as a single integrated system appearing as multiple hubs to the host. Thus, the host sees multiple hubs and allocates a larger maximum response time to account for the inherent delays of what the host thinks are multiple hubs and multiple cable segments between each hub pair. This larger allocated delay budget can be used elsewhere, e.g., to gain greater length between host and peripheral devices, effectively gaining a cable extension or longer flying time over the cable.

Furthermore, the hub system 106 preserves the same latency of a single hub and minimizes the required hardware resources to achieve a multiple-hub delay budget. For example, the prior hubs each have to include all the components of each hub 54 or 56 as shown in FIG. 2. In contrast, the hub system 106 can simulate multiple hubs using a small subset of these components. For example, the upstream hub core 152 does not need to include the transaction translator, port routing logic, downstream port logic (including its CDR and elasticity buffer), and downstream AFEs. Similarly, the downstream hub core does not need to include the upstream AFEs and upstream port logic (including its CDR and elasticity buffer). Each additional virtual hub that is implemented beyond two further increases the component savings. This greatly decreases the cost of the system 106 and reduces the latency of signals which would previously have had to be routed and processed by all the components in each of the multiple hubs. The savings in latency translates into delay budget which can be used to extend the length between host and peripherals.

Figure 6:
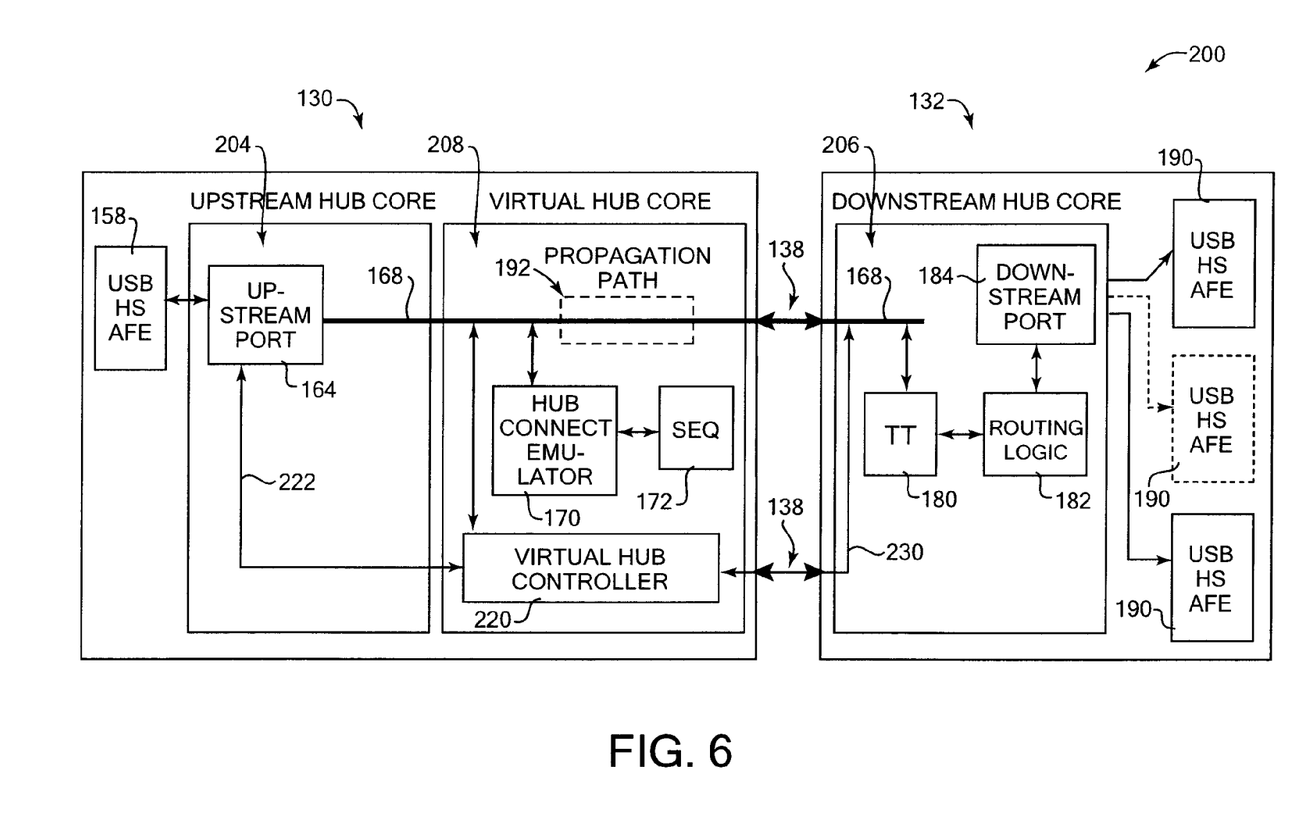
FIG. 6 is a block diagram of another example embodiment of the hub system of FIG. 3.

FIG. 6 is a block diagram illustrating another example embodiment 200 of a hub system 106. Similar components to the embodiments described above are noted with the same reference numbers. Hub system 200 includes a local hub portion 130 and a remote hub portion 132 as described above with respect to FIGS. 4-5. Local hub portion 130 includes one or more AFEs 158, upstream hub core 204, and virtual hub core 208. Remote hub portion 132 includes a downstream hub core 206 and AFEs 190.

Upstream hub core 204 is similar to the upstream hub core 152, described with reference to FIG. 5, including upstream port logic 164. Virtual hub core 208 is similar to the virtual hub core 156 described with reference to FIG. 5, including a hub connector emulator 170, sequence function block 172, and virtual hub controller 220. However, upstream hub core 204 does not include a first hub controller. Instead, the upstream port logic 164 outputs controller commands from the host on a line 222 that is connected to the virtual hub controller 220 of the virtual hub core. The virtual hub controller 220 thus acts as the hub controller for the first hub 121 in the series of hubs implemented by the hub system 200.

The downstream hub core 206 is similar to the downstream hub core 154 described with reference to FIG. 5, including a transaction translator 180, a port routing logic 182, and downstream port logic 184. However, downstream hub core 206 does not include a last hub controller. Instead, a controller line 230 is connected from the pass-through line 168 to provide host commands and data to the virtual hub controller 220 of the virtual hub core 208. The controller line 230 can be provided via the communication interface 136 and link 138 which connects the remote hub portion 132 to the local hub portion 130. In other embodiments, the line 230 is not used and the controller line 224 in the virtual hub core 208 can be used for last hub controller functions. The virtual hub controller 220 thus acts as the hub controller for the last hub 122 in the series of hubs implemented by the hub system 200.

The virtual hub controller 220 receives all commands from the host to configure or instruct any and all hubs 120 of the hub system 200. By providing all the hub controller functionality of the hub system 200 into the virtual hub controller 220, the hub system 200 can reduce the number of components used and the cost of manufacturing the system, as well as further reduce latency of signals propagating through the hub system.

Figure 7:
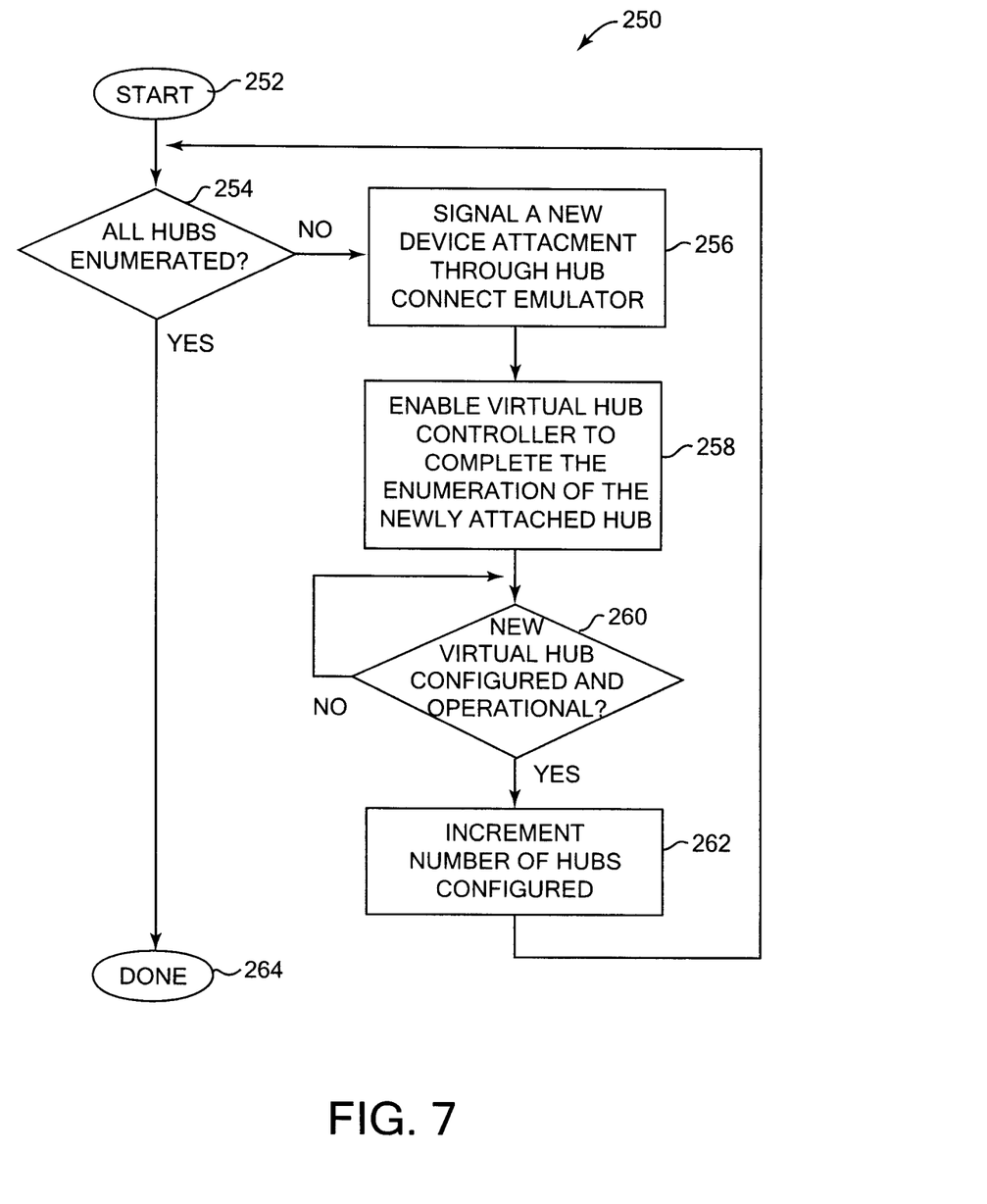
FIG. 7 is a flow diagram illustrating one example of a method implemented by the hub system to set up hubs in the system.

FIG. 7 is a flow diagram illustrating one example of a method 250 implemented by the virtual hub core 156 or 208 of the hub system 106 or 200 to set up hubs in system 100. For example, method 250 can be implemented by the sequence function block 172 of the virtual hub core. Method 250 can be implemented using software, hardware, or a combination of software and hardware elements. A software embodiment can include but is not limited to firmware, resident software, microcode, etc. In some embodiments, the method 250 can be implemented using a finite state machine (FSM) provided on the virtual hub controller 174 or other component of the hub system 106. Furthermore, embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk.

Prior to method 250, the interface hub 106 has determined that a connection of the hub system 106 has been made to the interface connecting the host. The first hub of the hub system 106 or 200 has been detected and enumerated by the host and first or virtual hub controller. The sequence function block 172, or other component of the hub system 106, and knows how many hubs are to be implemented by the system 106 based on predetermined preferences or settings stored in accessible memory or register, or from user input provided by an input device on the hub system or from the host. In some embodiments, the number of hubs to be implemented is configurable by operator or user.

The method begins at 252, and in step 254, it is checked whether all hubs of the hub system 106 have been enumerated. An enumerated hub has been fully configured by the host to be able to respond to requests by returning requested information and take other requested actions via the communication interface. Step 254 can be implemented, for example, upon boot-up of the host, or upon connection of the hub system 106 to an already-running host.

If all hubs of the hub system have not been enumerated, then the process continues to step 256, where a new device attachment is signaled through the hub connect emulator 170. The virtual hub core 156 or 208 presents an appropriate emulated signal that the host will recognize as indicating that a new device has been connected to the previous hub. In this case, the signal indicates that a new virtual hub has been connected to the already-enumerated previous hub in the series of hubs implemented by the hub system 106. For example, in embodiments using the USB communication interface, the sequence function block 172 can, in step 256, control the hub connect emulator 170 to present the appropriate signal on the interface such as the interrupt signal using the interrupt IN endpoint (described below), which the host polls and detects as a connection of a new device.

In next step 258, the virtual hub controller 174 of the virtual hub core is enabled to complete the enumeration of the newly attached virtual hub. In some embodiments, the host enumerates the virtual hub by issuing control transfers containing standard requests to the virtual hub controller and the virtual hub controller responds to the requests, and the host configures the virtual hub by instructing the virtual hub controller as to the functions of the hub. For example, in a USB embodiment, the host can enumerate the newly detected hub by using the standard USB enumeration process, including requesting the previous hub to reset the port at which the new virtual hub is connected and establish a communications path with the host, assigning a unique address to the new virtual hub, receiving and learning about the new virtual hub's abilities, and selecting and sending a request for a configuration of the virtual hub. These transactions are made between the host and the virtual hub controller. Once the configuration is complete, the virtual hub is enabled and has been enumerated, and the new virtual hub can detect and respond to any control request or other bus event at any time.

In step 260, the process checks whether the new virtual hub is configured and operational. The sequence function block 172, for example, can check to determine whether the enumeration process for the new virtual hub has been completed by the virtual hub controller and host. If it is not completed, the process checks again at step 260 until the enumeration is complete and process continue to step 262. In some embodiments, if the enumeration is not successful, error procedures are taken, such as restarting enumeration, reporting an error to the host, etc.

In step 262, the number of configured virtual hubs is incremented, and the process returns to step 254 to check whether all hubs have been enumerated. If not, another new device connection is signaled in step 256 using the hub connect emulator for the next virtual hub to be enumerated. In some embodiments having a separate last hub controller 186, if the last hub 122 of the system is to be enumerated, then a new device attachment is signaled in step 256, and in step 258 the last hub controller is enabled to complete the enumeration of the last hub 122. If all hubs have been enumerated at step 254, then the process is complete at 264.

In one example of a USB enumeration for a newly-connected device, the USB 2.0 specification specifies that a hub has a single interrupt endpoint "1 IN," which is endpoint address 1 in a hub-to-host direction. This endpoint is used to signal to the host the occurrence of changes in the status of the downstream ports of the hub. When a new device is connected to a downstream port of the hub, the hub detects this connection and signals the connection to the host by using the interrupt endpoint (any other hubs between the host and the hub act transparently in this case). For example, the host will be informed at bootup of the interrupt endpoint and will periodically poll the interrupt endpoint by sending out an interrupt packet, where the hub sends an interrupt endpoint data signal back to the host in response to the packet to inform the host of the presence of the new device. The host then instructs the hub (via the default control pipe) to reset the port where the new device was connected. This reset makes the new device assume address (endpoint) 0, and the host can then interact with the new device directly, resulting in the assignment of a new (non-zero) address to the device, and allowing enumeration of the device and configuration of the device by the host.

Thus, relating the above example process to the present embodiments, each hub 120 acts as the connected "new device" in turn, with the just previously enumerated hub 120 in the series acting as the "hub." For example, the first hub finishes enumerating and the hub connect emulator 170 provides a signal indicating the connection of a new, second (virtual) hub to a downstream port of the first hub, such that this signal is sent to the host in response to a host poll. The host then instructs the first hub to reset its downstream port and the host communicates with the virtual hub controller 174 to enumerate the second hub. The hub connect emulator 170 then provides a signal indicating the connection of a new, third (virtual) hub to a downstream port of the second hub, such that the host instructs the second hub via the virtual hub controller 174 to reset that downstream port and the host enumerates the third hub; and so on. The hubs before the last hub each have only one downstream port that connects to the next virtual hub. The last hub has the physical downstream ports 112 of the hub system 106. In some embodiments of FIG. 5, the last hub is enumerated and controlled by the last hub controller 186 after the connection of the last hub is signaled by the hub connect emulator 170 and (in some embodiments) the previous virtual hub's downstream port is reset by the virtual hub controller 174.

The embodiments described herein allows the latency of hubs and cables to be re-budgeted by using virtual hubs. The hub systems described herein allow this re-budgeting using minimal device or circuit area in the hub system and with reduced components and delay impact. The embodiments herein thus allow multiple USB hubs to be utilized for their delay budget without adding costly physical hubs with redundant physical components.

The embodiments described herein allow the use of a common interface standard, such as USB, with greater distances provided between host and peripheral devices. Embodiments allow data re-driving to extend the interface cable length, such that inexpensive devices and components compatible with the interface standard can be connected at greater distances without having to connect devices using a more expensive or incompatible type of interface.

The embodiments described herein are with reference to the USB 2.0 interface. However, other interface standards can be used in other embodiments in accordance with embodiments herein. For example, the USB 3.0 interface including "superspeed" traffic can be used including appropriate changes for the differences from USB 2.0 (such as differences in enumeration procedure).

Although various examples have been described using specific terms and devices, such description is for illustrative purposes only. The words used are words of description rather than of limitation. In addition, it should be understood that aspects of various other examples may be interchanged either in whole or in part. It is therefore intended that the claims be interpreted in accordance with their true spirit and scope and without limitation or estoppel.

What is claimed is:

1. A communication interface hub comprising:
 a plurality of ports, wherein one of the ports is an upstream port operative to be in at least one of direct and indirect communication with a host and wherein at least one other of the ports is a downstream port operative to be in at least one of direct and indirect communication with at least one device;
 at least one hub core coupled to the ports and implementing at least one physical hub; and at least one virtual hub core coupled to the ports and implementing at least one virtual hub, the at least one virtual hub core comprising a hub connect emulator coupled to the at least one hub core implementing the at least one physical hub to indicate coupling of the at least one virtual hub to the host, a sequence function block coupled to the hub connect emulator to control the hub control emulator to signal coupling of the at least one virtual hub to the at least one hub core implementing the at least one physical hub, and a virtual hub controller coupled to the at least one hub core implementing the at least one physical hub to manage traffic between the host and the at least one virtual hub, the at least one virtual hub being detectable as at least one physical hub by the host to cause the host to allocate an additional time delay in waiting for responses to signals output by the host.

2. A communication interface hub as recited in claim 1 wherein the communication with the host and the at least one device is implemented according to a standardized communication interface.

3. A communication interface hub as recited in claim 2 wherein the standardized communication interface is Universal Serial Bus (USB).

4. A communication interface hub as recited in claim 2 wherein the additional time delay is budgeted to provide a greater physical connection distance between the host and the at least one device.

5. A communication interface hub as recited in claim 4 wherein the communication interface hub includes a local hub portion and a remote hub portion connected by an interface cable having a length greater than allowed by the standardized communication interface.

6. A communication interface hub as recited in claim 1 wherein the at least one hub core includes:
a first hub core coupled between the virtual hub core and the upstream port, and
a last hub core coupled between the virtual hub core and the downstream port.

7. A communication interface hub as recited in claim 6 wherein the first hub core and the last hub core each only includes a subset of the components required for a standard hub implemented according to a standardized communication interface.

8. A communication interface hub as recited in claim 7 wherein the first hub core does not include a transaction translator, port routing logic, downstream port logic, and a downstream analog front-end.

9. A communication interface hub as recited in claim 7 wherein the last hub core does not include upstream port logic and an upstream analog front-end.

10. A communication interface hub as recited in claim 1 wherein the virtual hub controller is operative to receive and implement commands from the host provided to the at least one virtual hub and to control an enumeration of each of the at least one virtual hub for the host.

11. A communication interface hub as recited in claim 1 wherein the hub connect emulator is operative to provide signals to the host indicating that the at least one virtual hub has been connected as at least one corresponding physical hub.

12. A communication interface hub as recited in claim 6 wherein the first hub core controls a first hub connected to the at least one virtual hub, and wherein a last hub core controls a last hub coupled to the at least one virtual hub.

13. A communication interface hub as recited in claim 6 wherein the virtual hub controller provided in the virtual hub core controls the at least one physical hub and the at least one virtual hub.

14. A method for providing a hub for a communication interface comprising:
determining that a connection of an interface hub implementing at least one physical hub coupled to a host has occurred via a communication interface; and
using the interface hub, emulating at least one additional hub to the host, the at least one additional hub including at least one virtual hub comprising a hub connect emulator coupled to the interface hub to indicate coupling of the virtual hub to the host, a sequence function block coupled to the hub connect emulator to control the hub control emulator to signal coupling of the at least one virtual hub to the interface hub implementing the at least one physical hub, and a virtual hub controller coupled the interface hub implementing the at least one physical hub to manage traffic between the host coupled to the interface hub and the virtual hub.

15. A method as recited in claim 14 where the interface hub is connected to the host at an upstream port of the interface hub, and further comprising connecting at least one device to at least one downstream port of the interface hub.

16. A method as recited in claim 15 wherein the detection of the at least one virtual hub causes the host to allocate an additional time delay in waiting for responses to signals output by the host, and wherein the additional time delay is used to extend a distance between the host and the at least one device connected to the downstream port of the interface hub.

17. A method as recited in claim 14 further comprising emulating a connection of the at least one additional hub to the host, including providing signals to the host indicating that the at least one virtual hub has been connected as at least one corresponding physical hub.

18. A method as recited in claim 14 further comprising receiving at least one command from the host to enumerate each of the at least one virtual hub.

19. A communication interface hub comprising:
a first hub core implementing at least one physical hub coupled to an upstream port;
a last hub core coupled to a downstream port; and
a virtual hub core coupled between the first hub core and the last hub core, the virtual hub core comprising a hub connect emulator coupled to the first hub core implementing the at least one physical hub to indicate coupling of the virtual hub core to the upstream port, a sequence function block coupled to the hub connect emulator to control the hub control emulator to signal coupling of the at least one virtual hub core to the first hub core implementing the at least one physical hub, and a virtual hub controller coupled to the first hub core implementing the at least one physical hub to manage traffic between a host coupled to the upstream port and the at least one virtual hub core, wherein the virtual hub core implements at least one virtual hub.

20. A communication interface hub as recited in claim 19 wherein communication via the upstream port and the downstream port is according to a standardized communication interface, wherein the first hub core and the last hub core each only includes a subset of the components required for a standard hub implemented according to a standardized communication interface.

* * * * *